No. 798,267. PATENTED AUG. 29, 1905.
L. CRON.
ART OF MILLING.
APPLICATION FILED NOV. 23, 1903.

Witnesses:
Edwin G. Balinger.

Inventor:
Ludwig Cron,
by Georgii & Massie
his attorneys

UNITED STATES PATENT OFFICE.

LUDWIG CRON, OF MUNICH, GERMANY.

ART OF MILLING.

No. 798,267.   Specification of Letters Patent.   Patented Aug. 29, 1905.

Application filed November 23, 1903. Serial No. 182,374.

*To all whom it may concern:*

Be it known that I, LUDWIG CRON, a citizen of the Empire of Germany, residing at Munich, Bavaria, Germany, have invented certain new and useful Improvements in the Art of Milling; and I do hereby declare the following to be a full, clear, and exact description of the invention, such as will enable others skilled in the art to which it appertains to make and use the same.

This invention relates to improvements in the art of milling, and particularly the production of flour from wheat, being designed to overcome objections existing in the methods of milling heretofore known.

Under the practice known as "low milling" the grain is subjected to a grinding action between stones or rolls under great pressure and having considerable differential velocities, the object being to produce at the first operation a high percentage of flour as compared with the tailings. The superfine flour having been separated from the product by bolting, the middlings are again subjected to a similar grinding action and an inferior grade of flour obtained, due to the presence of finely-pulverized grain-hulls. As distinguished from this method, the high-milling process consists in subjecting the grain to a series of coarse grindings with intervening cleaning operations, whereby it is designed to free the hulls from the flour-containing portions, which are later ground to the desired degree of fineness. The two methods described possess inherent defects, the one resulting by a comparatively simple process in a large proportion of inferior flour smoothly ground and the latter being rendered exceedingly expensive because of the prolonged and complex series of operations.

This invention resides in a new method which differs from those above described in that the method is exceedingly simple and economical, while the result is a very high percentage of the best flour, which may be, if desired, coarsely ground.

In order that my process may be clearly understood, I have in the accompanying drawings illustrated diagrammatically the arrangement of different portions of apparatus by which the method may be carried out.

Figure 1:
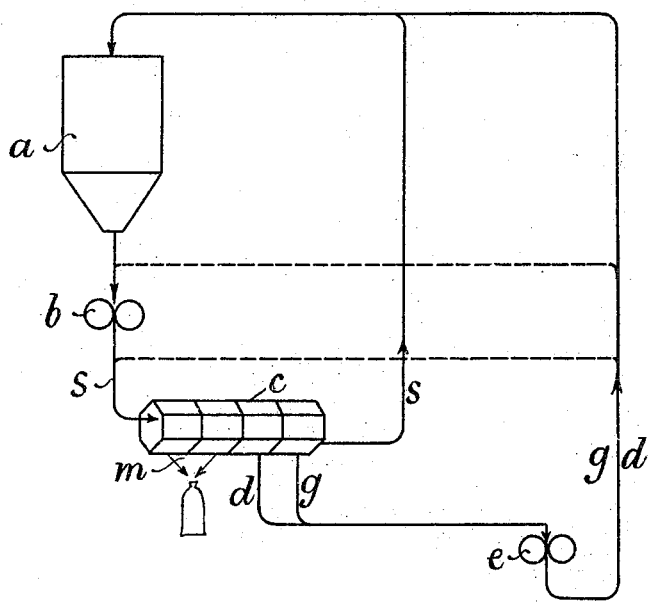
Figure 2:
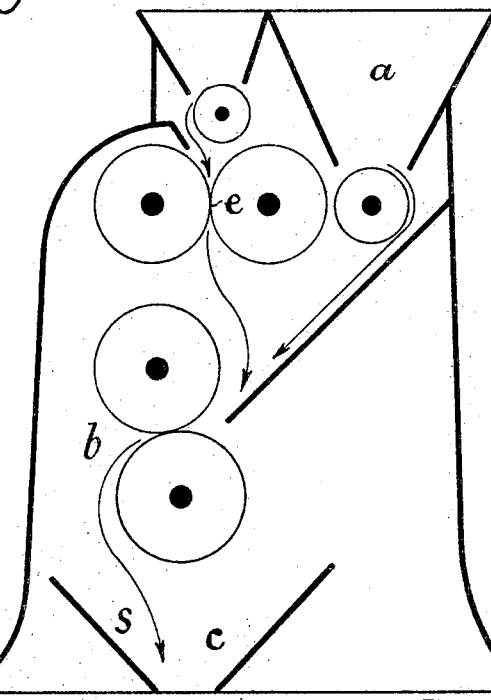

In the drawings, Figure 1 represents graphically the preferred process with modifications. Fig. 2 represents a preferred arrangement of apparatus also in a diagrammatical manner.

In practice the grain is placed within a suitable hopper $a$, whence it is fed to crushing-rolls $b$, which are so spaced apart as to crush the grain without exerting a high degree of pressure thereon. The product S is then passed to the usual sieve or bolting apparatus $c$, from which the comparatively small percentage of superfine flour is taken at $m$, ready for use, and the pulverulent matter $d$ and the grits $g$ are collected and passed through the grinding-rolls $e$. The product from the grinding-rolls may then be bolted, as indicated in the broken line in Fig. 1, or it may be mingled with the bran $s$ from the bolting apparatus and passed with other untreated grain to the crushing-rolls $b$. This may be done by leading the product from the grinding-rolls, together with the bran, to the grain-hopper $a$, as indicated in full lines in Fig. 1, or to the crushing-rolls direct, as shown in dotted lines in said figure and as exemplified in Fig. 2. After the second crushing operation the product is passed to the bolting apparatus, as before, and thus in cycle.

It will be observed that by this improved method the bran is at no time submitted to a grinding action, but merely to crushing, whereby the flour-yielding matter is separated therefrom. By passing the bran through the crushing-rolls again together with fresh wheat the attrition serves to loosen from the bran any adhering flour material. Thus the hulls of the grain, freed entirely from the flour, remain sufficiently large as not to pass through the bolting apparatus, while the only portion of the product subjected to fine grinding is that which has been already completely separated from the bran. In this way a very high standard of flour is obtained by a comparatively simple and inexpensive process, as distinguished from the unsatisfactory results attained by the processes heretofore known and practiced.

Wherefore, having thus fully disclosed my invention and the manner of carrying out the same, what I claim as new, and desire to secure by Letters Patent, is—

1. The process of milling, which consists in crushing the grain, bolting, grinding the grits together, adding the entire product to the bran and passing again through the crushing-rolls and bolting.

2. The process of milling, which consists in coarsely crushing the grain, bolting, grinding the grits, adding the entire product to the bran, and passing again together with fresh grain through the crushing-rolls, and bolting.

3. The process of milling, which consists in coarsely crushing the grain, bolting, grinding the grits, bolting, adding the tailings to the bran, passing again together with fresh grain through the crushing-rolls, and bolting.

In testimony whereof I affix my signature to this specification in the presence of two witnesses.

LUDWIG CRON.

Witnesses:
ABRAHAM SCHLESINGER,
HERMANN M. SCHELLING.